R. I. COWDEN.
Combined Planter.

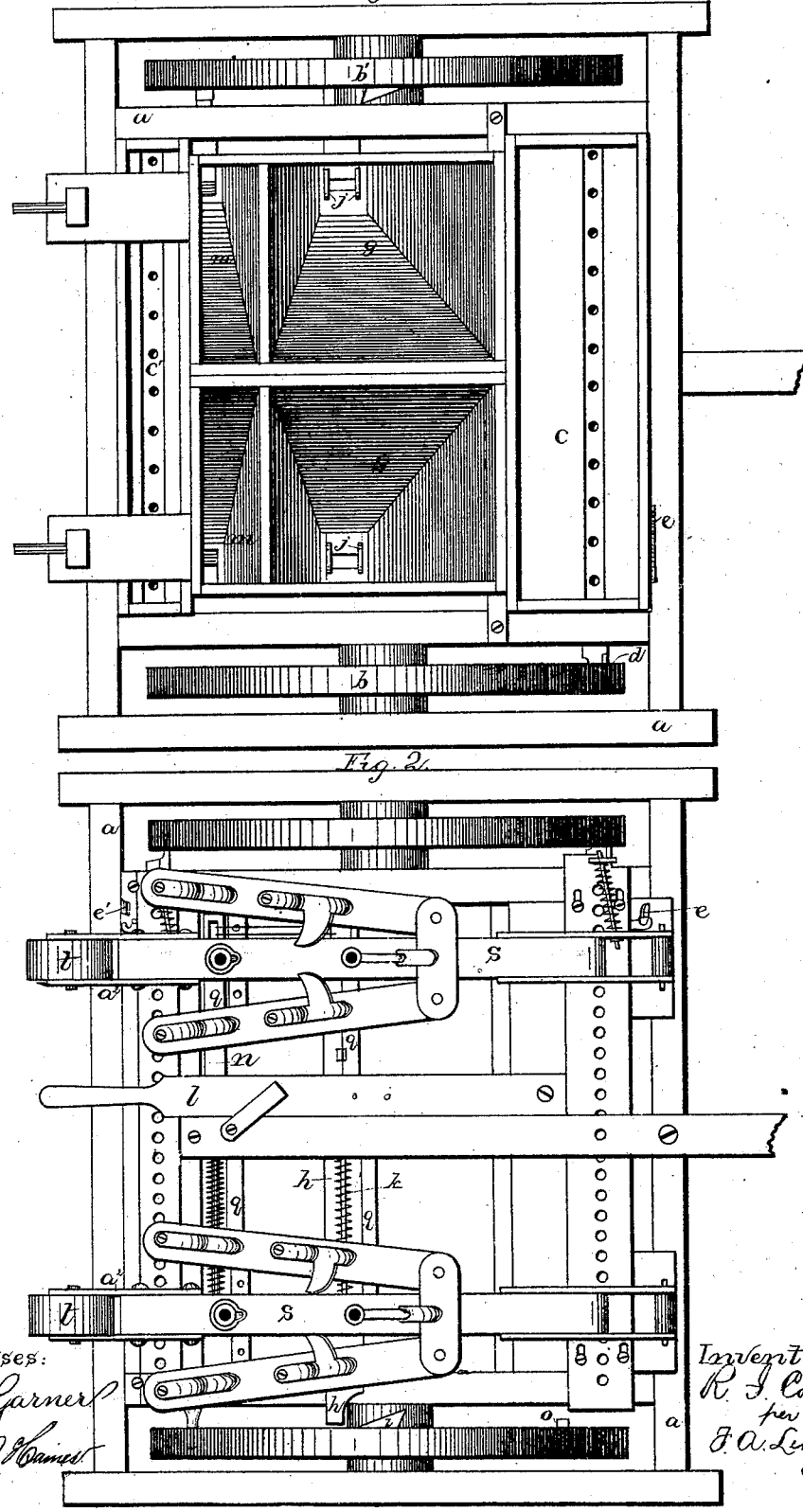

No. 216,781. Patented June 24, 1879.

Witnesses:
J. W. Garner
W. S. D. Haines

Inventor:
R. I. Cowden
per
F. A. Lehmann, atty.

UNITED STATES PATENT OFFICE.

ROBERT I. COWDEN, OF DE WITTVILLE, NEW YORK.

IMPROVEMENT IN COMBINED PLANTERS.

Specification forming part of Letters Patent No. 216,781, dated June 24, 1879; application filed April 10, 1879.

*To all whom it may concern:*

Be it known that I, ROBERT I. COWDEN, of De Wittville, in the county of Chautauqua and State of New York, have invented certain new and useful Improvements in Combined Planters; and I do hereby declare the following to be a full, clear, and exact description of the invention, such as will enable others skilled in the art to which it pertains to make and use it, reference being had to the accompanying drawings, which form part of this specification.

My invention relates to an improvement in combined planters; and it consists in the arrangement and combination of parts that will be more fully described hereinafter.

Figure 3:
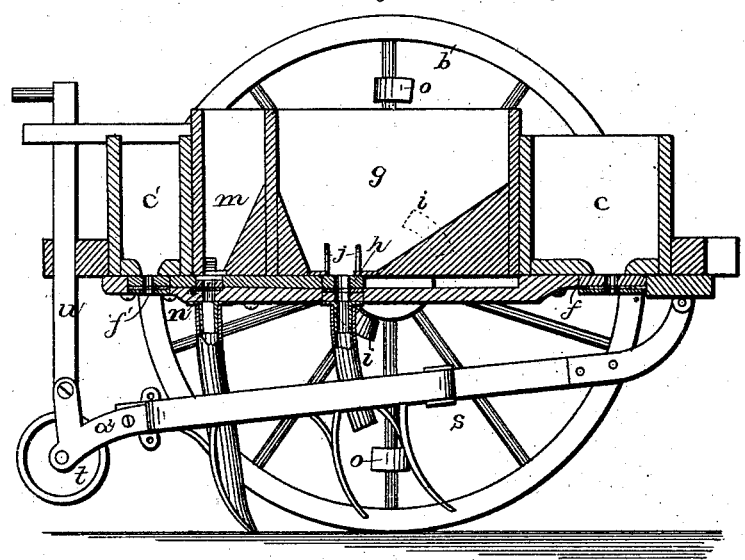
Figure 4:
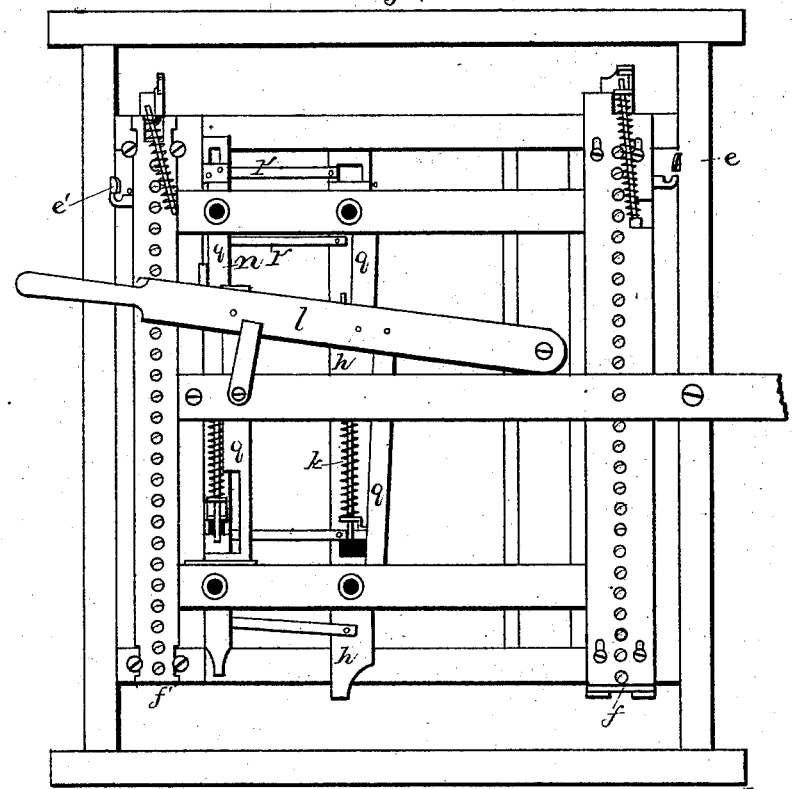

Figure 1 is a plan view of my invention. Fig. 2 is an inverted view. Fig. 3 is a vertical section of my planter; and Fig. 4 is an inverted view of the same with the cultivators removed.

$a$ represents a rectangular frame, of any suitable construction, and which is mounted on the two driving-wheels $b$ $b'$. Upon the front end of this frame is located the seed-box $c$, for sowing broadcast any kind of seed, and which has its slide, operated by the cams $d$, on the inside of the wheel $b$. This slide can be moved inward, so as not to operate at all, when so desired, by means of the lever $e$, and the amount of grain to be sowed is regulated by the longitudinally-moving plate $f$. At the opposite end of the frame is placed a narrower box, $c'$, in which is placed grass-seed, phosphates, lime, &c., and which has its slide operated by the cams $d$, and capable of being thrown out of gear by a lever, $e'$. This box is also provided with a regulating-plate, $f'$. Back of the box $c$ are the two boxes $g$, in which phosphate or fertilizers of any kind are placed when corn is being planted, and which is also especially constructed for planting potatoes when it is desired to use the machine for that purpose. The bottoms of these two boxes slant toward the outer sides of the machine and down toward the holes through which the fertilizer or potatoes are fed.

The slide $h$, which extends across the under side of the frame and operates in each box, is operated by means of the two cam-blocks $i$, placed next to or near the hub of the wheel $b'$. Secured to each end of this slide, and moving back and forth in the bottoms of the two boxes, are the cutters $j$, which act as stirrers to the fertilizers and to slice the potatoes. This slide is made to slide back into position again, after having been moved by the cams, by the spring $k$; and it also has connected to it the long hand-lever $l$, which extends back beyond the rear edge of the frame, so that the slide can be operated by hand, or to throw the slide out of operation when moving the machine to and from the field, or while the other seed-boxes are in use. Back of the two boxes $g$ are the two corn-boxes $m$, the bottoms of which incline outward, and under which operates the seed-slide $n$. This slide is operated by means of the two cam-blocks $o$, placed on the inside of the wheel $b'$ out near its rim, and back of the blocks $i$. The relative arrangements of these blocks is such that the ones $i$ first operate the slide $h$, so as to drop the fertilizer, and then the machine moves forward just far enough to bring the corn-tubes over the place where the fertilizer lies, when the blocks $o$ operate the slide $n$ and drop the corn upon it. This slide $n$ is also provided with a spring for returning it to position again, and is connected to the hand-lever $l$, so that it can be thrown out of gear when it is desired to stop its operation. Fastened to this lever are the four plates $q$, one of which extends under each one of the four boxes $g$ $m$, and forms the bottom to the openings in the slides while the machine is turning around at the ends of the rows, and thus prevent the grains from being dropped.

Fastened to the slide $h$ are the two flat rods $r$, which project backward as far as the top of the slide $n$, where they turn outward and reach under the corn-boxes $m$. The ends of these rods $r$ are bent upward, and move back and forth in the holes in the bottoms of the boxes for the purpose of pushing the grains of corn into the holes in the slide $n$. When the slide $h$ moves these flat rods move with it, forcing the grain into the slide, and then spring back with the slide $h$ before the slide $n$ begins to move.

When it is desired to plant potatoes the corn-slide $n$ can be held out of gear by the lever $l$ without moving the slide $h$, thus using the slide $h$ only.

Fastened to the front ends of the planter are the two cultivators $s$, each one of which consists of a central beam and two adjustable side ones, so as to regulate the distance between the hoes. The rear end of each of these cultivators is supported upon the roller $t$, which is connected to the vertical handles $u$, by means of the adjustable plates $a^2$, which handles pass up through suitable guides on the rear end of the machine. By adjusting these handles the depth of the furrows made by the hoes can be regulated at will. The hoes used may either be such as are here shown or any other that may be preferred, so that they open the furrows for the fertilizers and corn and then cover them over.

Having thus described my invention, I claim—

1. The combination of the two slides $h$ $n$ and hand-lever $l$, whereby both slides, or only one, can be thrown out of operation, substantially as shown.

2. The combination of the hand-lever $l$, one or more slides, and the plates $q$, substantially as set forth.

3. The combination of the seed-slides $h$ $n$ and flat rods $r$, having their rear ends shaped substantially as described, so as to push the grains of corn into the holes in the slide, as specified.

In testimony that I claim the foregoing I have hereunto set my hand this 27th day of March, 1879.

ROBERT I. COWDEN.

Witnesses:
C. H. YOUNG,
ANDREW J. HULL.